(12) United States Patent
Moravy et al.

(10) Patent No.: US 8,205,900 B1
(45) Date of Patent: Jun. 26, 2012

(54) VEHICLE SUSPENSION ASSEMBLY

(75) Inventors: Lars D. Moravy, Powell, OH (US);
Dennis J. Plank, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 12/712,961

(22) Filed: Feb. 25, 2010

(51) Int. Cl.
*B60G 3/26* (2006.01)

(52) U.S. Cl. .......... 280/124.138; 280/124.139; 280/86.5

(58) Field of Classification Search ........... 280/124.138,
280/124.107, 93.511, 124.135, 124.111,
280/124.134, 124.139, 124.141, 124.145,
280/124.146, 124.15, 124.153, 124.154,
280/86.5, 86.75, 86.751
See application file for complete search history.

(56) References Cited

U.S. PATENT DOCUMENTS

| | | | |
|---|---|---|---|
| 5,439,244 A * | 8/1995 | Tomosada et al. | 280/124.139 |
| 5,782,484 A * | 7/1998 | Kuhn, Jr. | 280/124.142 |
| 6,273,407 B1 | 8/2001 | Germano | |
| 6,296,264 B1 | 10/2001 | Wimmer | |
| 6,776,402 B2 | 8/2004 | Miyamoto et al. | |
| 7,178,815 B2 | 2/2007 | Cai et al. | |
| 7,318,505 B2 | 1/2008 | Muller et al. | |
| 7,621,545 B2 * | 11/2009 | Byers et al. | 280/86.75 |
| 7,793,954 B2 * | 9/2010 | Kucinski et al. | 280/124.134 |
| 7,914,020 B2 * | 3/2011 | Boston | 280/86.751 |
| 8,061,726 B2 * | 11/2011 | Kunert et al. | 280/124.15 |
| 2003/0006574 A1 | 1/2003 | Momose et al. | |
| 2003/0234504 A1 | 12/2003 | Frantzen | |
| 2004/0140640 A1 | 7/2004 | Frantzen et al. | |
| 2005/0146111 A1 * | 7/2005 | Yamazaki et al. | 280/124.135 |
| 2007/0290473 A1 * | 12/2007 | Buma | 280/124.106 |

(Continued)

FOREIGN PATENT DOCUMENTS

DE 4242815 6/1993

(Continued)

OTHER PUBLICATIONS

European Search Report of European Patent Application No. 11151671.2 dated Mar. 10, 2011.

*Primary Examiner* — Faye M Fleming
*Assistant Examiner* — Karen A Beck
(74) *Attorney, Agent, or Firm* — Rankin, Hill & Clark LLP

(57) ABSTRACT

A suspension assembly for a vehicle includes a knuckle, a spring-damper assembly laterally spaced from the knuckle, a first control arm having an inner end and an outer end, a second control arm having an inner end and an outer end, and a stability link having an inner end and an outer end. The inner end of the first control arm is connected to a vehicle body and the outer end of the first control arm is connected to the knuckle by a lower ball joint. The spring-damper assembly is rotatably connected to the first control arm at a lower arm pivot location between the inner and outer ends of the first control arm. The inner end of the second control arm is rotatably connected to the spring-damper assembly at a second control arm pivot location spaced apart from the first control arm pivot location and the outer end of the first control arm is connected to the knuckle by a upper ball joint. The inner end of the stability link is rotatably connected to at least one of the first control arm and the vehicle body, and the outer end of the stability link is rotatably connected to at least one of the spring-damper assembly and the knuckle.

19 Claims, 8 Drawing Sheets

U.S. PATENT DOCUMENTS

2008/0067774 A1* 3/2008 Sanville et al. ........ 280/124.138
2008/0203690 A1* 8/2008 Horiuchi et al. .......... 280/86.75
2009/0160153 A1* 6/2009 Kunert et al. .......... 280/124.138

FOREIGN PATENT DOCUMENTS

| | | |
|---|---|---|
| DE | 4242815 A1 * | 6/1993 |
| DE | 10007662 | 2/2010 |
| EP | 0486337 | 5/1992 |
| EP | 0630770 | 12/1994 |
| EP | 0935537 | 8/1999 |
| FR | 2681291 | 3/1993 |
| GB | 2309947 | 8/1997 |
| JP | 5169939 | 7/1993 |
| JP | 2004338680 | 12/2004 |
| KR | 20030049172 | 6/2003 |
| WO | 9821058 | 5/1998 |

* cited by examiner

VEHICLE SUSPENSION ASSEMBLY

BACKGROUND

The present disclosure generally relates to vehicle suspensions, and more particularly relates to an improved vehicle suspension having a kingpin axis that is substantially free of constraints imposed by the vehicle body.

Kingpin axis is a commonly used term used to define the axis about which a vehicle's tire is steered and is generally defined by one upper and one lower rotating component of a vehicle suspension. The kingpin angle is the angle of the kingpin axis relative to a vertical axis of the vehicle laterally disposed at a center of the wheel mounted on the knuckle. The kingpin offset is the distance between this center and the kingpin axis.

The kingpin offset can be thought of as the moment arm of a force acting about the kingpin axis. Thus, a smaller kingpin offset is advantageous as it reduces the disturbance caused by acceleration, commonly called torque steer. Furthermore, reducing the kingpin angle improves the geometrical efficiency of the steering system, which leads to reduced power demands from the steering system.

One of the most widely used vehicle suspension systems is the MacPherson strut suspension assembly. In this type of suspension assembly, a strut assembly, which includes a coil spring and a shock absorber, extends from the upper end of a knuckle to the vehicle body and a lower arm extends from a lower end of the knuckle to the vehicle body. A ball joint is used to rotatably connect the knuckle to the lower arm, while the strut assembly is rotatably connected to the body, typically by means of a bearing. The kingpin axis of the MacPherson strut assembly is defined by the lower ball joint connecting the knuckle to the lower arm and an upper mounting location at which the upper end of the strut assembly is connected to the vehicle body.

While widely employed, the MacPherson strut suspension assembly has certain limitations. For example, the kingpin angle is often limited to a relatively large angle (e.g., 10-15 degrees) and the kingpin offset is generally limited to a relatively large dimension (e.g., 60-80 mm). A further limitation of the MacPherson strut suspension assembly is that the long virtual arm of the strut assembly and the lower arm makes it difficult for the designer to tune the amount of camber change that occurs during suspension stroking.

Another widely used vehicle suspension system is the double wishbone suspension. In this type of suspension assembly, two wishbone-shaped arms locate the wheel. More specifically, a lower arm has an outer end connected to a lower end of a knuckle via a ball joint and has its inner wishbone-shaped arms connected to the vehicle body. An upper arm similarly has an outer end connected to an upper end of the knuckle via a ball joint and has its inner wishbone-shaped arms connected to the vehicle body at locations flanking an upper end portion of the spring-damper assembly. The spring-damper assembly has a lower end connected to the lower arm at a location offset from the lower ball joint and has its upper end mounted to the vehicle body. The kingpin axis of the double wishbone suspension assembly is defined by the lower ball joint connecting the lower arm to the knuckle and the upper ball joint connecting the upper arm to the knuckle.

While more expensive and complex, double wishbone suspension assemblies generally afford more freedom of design, which allows better control of suspension parameters such as camber angle, toe angle, etc. Also, the kingpin angle can be reduced (e.g., to 8-11 degrees) and the kingpin offset can be reduced (e.g., to 45-60 mm), particularly as compared to the MacPherson suspension assembly. However, in addition to cost and complexity, the double wishbone suspension assembly can sometimes require more packaging space on the vehicle.

In both the MacPherson strut type and the double wishbone type suspension assemblies, the kingpin axis is dependent on the particular location of one or more suspension components connected to the vehicle body. As such, a designer of these suspensions has limited flexibility to alter the kingpin axis, kingpin angle, or kingpin offset due to the constraints of the vehicle body. Furthermore, the vehicle body structures for each suspension type are usually unique and not interchangeable.

SUMMARY

According to one aspect, a suspension assembly for a vehicle includes a knuckle, a spring-damper assembly laterally spaced from the knuckle, a first control arm having an inner end and an outer end, a second control arm having an inner end and an outer end, and a stability link having an inner end and an outer end. The inner end of the first control arm is connected to a vehicle body and the outer end of the first control arm is connected to the knuckle by a lower ball joint. The spring-damper assembly is rotatably connected to the first control arm at a lower arm pivot location between the inner and outer ends of the first control arm. The inner end of the second control arm is rotatably connected to the spring-damper assembly at a second control arm pivot location spaced apart from the first control arm pivot location and the outer end of the first control arm is connected to the knuckle by a upper ball joint. The inner end of the stability link is rotatably connected to at least one of the second control arm or the vehicle body, and the outer end of the stability link is rotatably connected to at least one of the spring-damper assembly or the knuckle.

According to another aspect, this suspension assembly includes a lower arm having an inner portion rotatably connected to a vehicle body about a lower arm connecting axis and a spring-damper assembly rotatably connected to the lower arm about a spring-damper connecting axis. A knuckle has a lower end connected to an outer portion of the lower arm by a lower ball joint. An upper arm has an inner portion rotatably connected to the spring-damper assembly about an upper arm connecting axis. The upper arm has an outer portion connected to an upper end of the knuckle by an upper ball joint. A stability link has a first end connected to at least one of the lower arm or the vehicle body, and a second end connected to at least one of the spring-damper assembly or the knuckle.

According to still another aspect, a method for constructing a variably tuned suspension assembly is provided. In the method of this aspect, an inner end of a first control arm is rotatably connected to a vehicle body and an outer end of the first control arm is rotatably connected to a first ball joint of a knuckle. A spring-damper assembly is rotatably connected to the first control arm at a first control arm pivot location between the inner and outer ends of the first control arm. An inner end of a second control arm is rotatably connected to the spring-damper assembly at a second control arm pivot location and an outer end of the second control arm is rotatably connected to a second ball joint of the knuckle. An inner end of a stability link is rotatably connected to one of the first control arm or the vehicle body and an outer end of the stability link is rotatably connected to the spring-damper assembly to limit axial rotation thereof.

DETAILED DESCRIPTION

Figure 1:
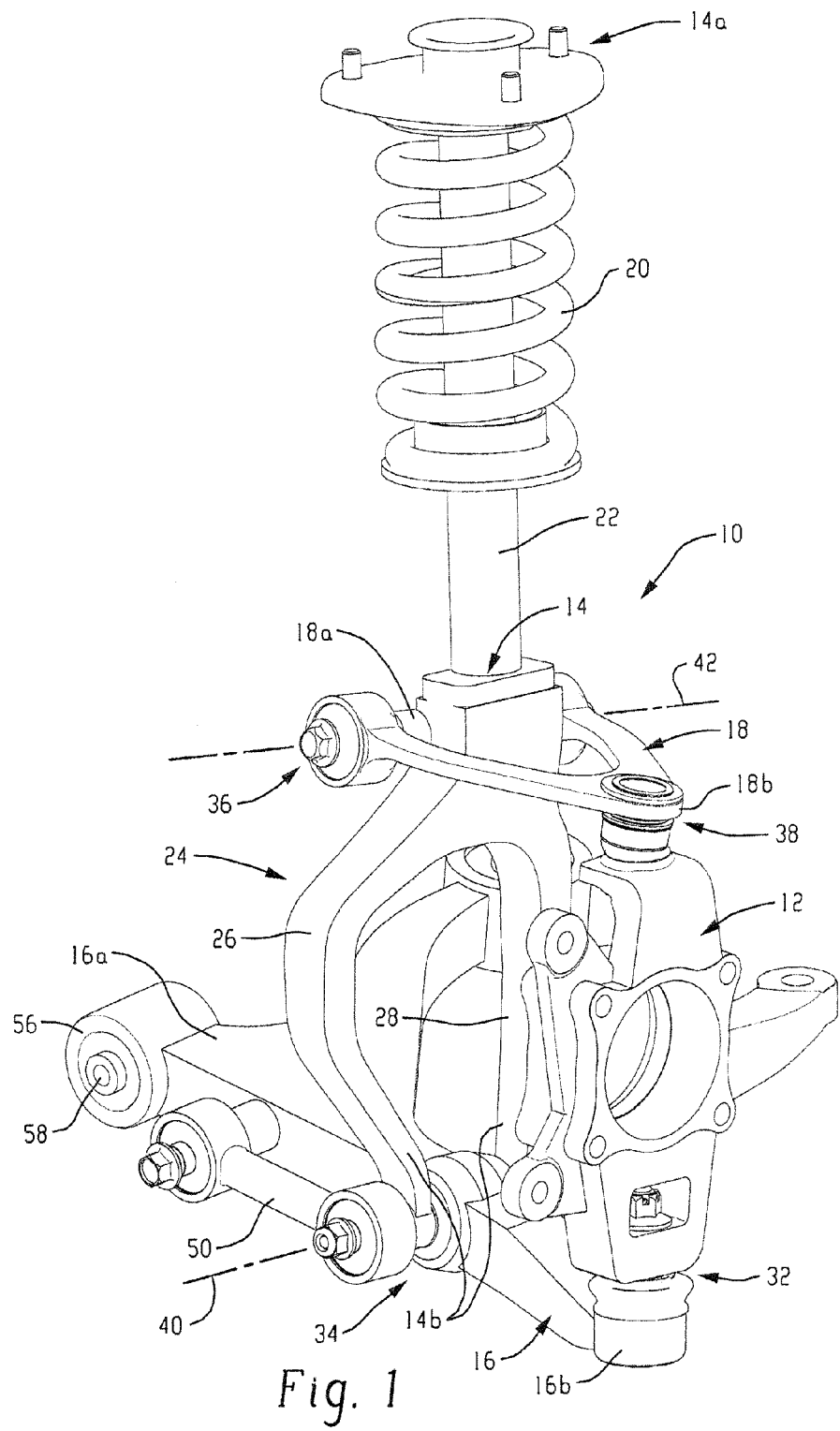
FIG. 1 is a perspective view of a suspension assembly

Referring now to the drawings, wherein the showings are only for purposes of illustrating one or more exemplary embodiments and not for purposes of limiting the same, FIG. 1 illustrates a suspension assembly 10 for a vehicle. As shown, the suspension assembly 10 includes a knuckle 12 for rotatably supporting a wheel (not shown) and a spring-damper assembly 14 laterally spaced inwardly from the knuckle 12. The suspension assembly 10 further includes arms 16, 18 connecting the knuckle 12 to the spring-damper assembly 14. The spring-damper assembly 14 extends substantially vertically, while the arms 16, 18 extend substantially horizontally.

As is known and understood by those skilled in the art, the spring-damper assembly 14 can be of the type having a coil spring 20 coaxially surrounding a damper portion 22 adjacent an upper end 14a of the spring-damper assembly 14. The upper end 14a of the spring-damper assembly 14 is mounted to a part of a vehicle body (not shown), such as a fender. In the illustrated embodiment, the spring-damper assembly 14 has a fork 24 with legs 26, 28 formed at a lower end 14b thereof. The legs 26, 28 are spaced apart such that they are capable of accommodating a driveshaft therebetween. Arm 16, which can be referred to as a lower arm in the illustrated embodiment, is directly connected to the spring-damper assembly 14 and one end of the knuckle 12. The lower arm 16 is also connected to a part of the vehicle body, such as a side frame member or subframe. Arm 18, which can be referred to as an upper arm in the illustrated embodiment, is directly connected to the spring-damper assembly 14 and another, opposite end of the knuckle 12.

More specifically, the lower arm 16 has an inner portion or end 16a and an outer portion or end 16b. The inner end 16a of the lower arm 16 is rotatably connected to the vehicle body about a first control arm connecting axis 30 (FIG. 4) and the outer end 16b of the lower arm 16 is connected to the knuckle 12 by a first ball joint 32 (a lower ball joint in the illustrated embodiment). The spring-damper assembly 14 is rotatably connected to the lower arm 16 about a spring-damper connecting axis 40 at a first control arm pivot location 34 disposed between the inner and outer ends 16a, 16b of the lower arm 16.

Figure 2:
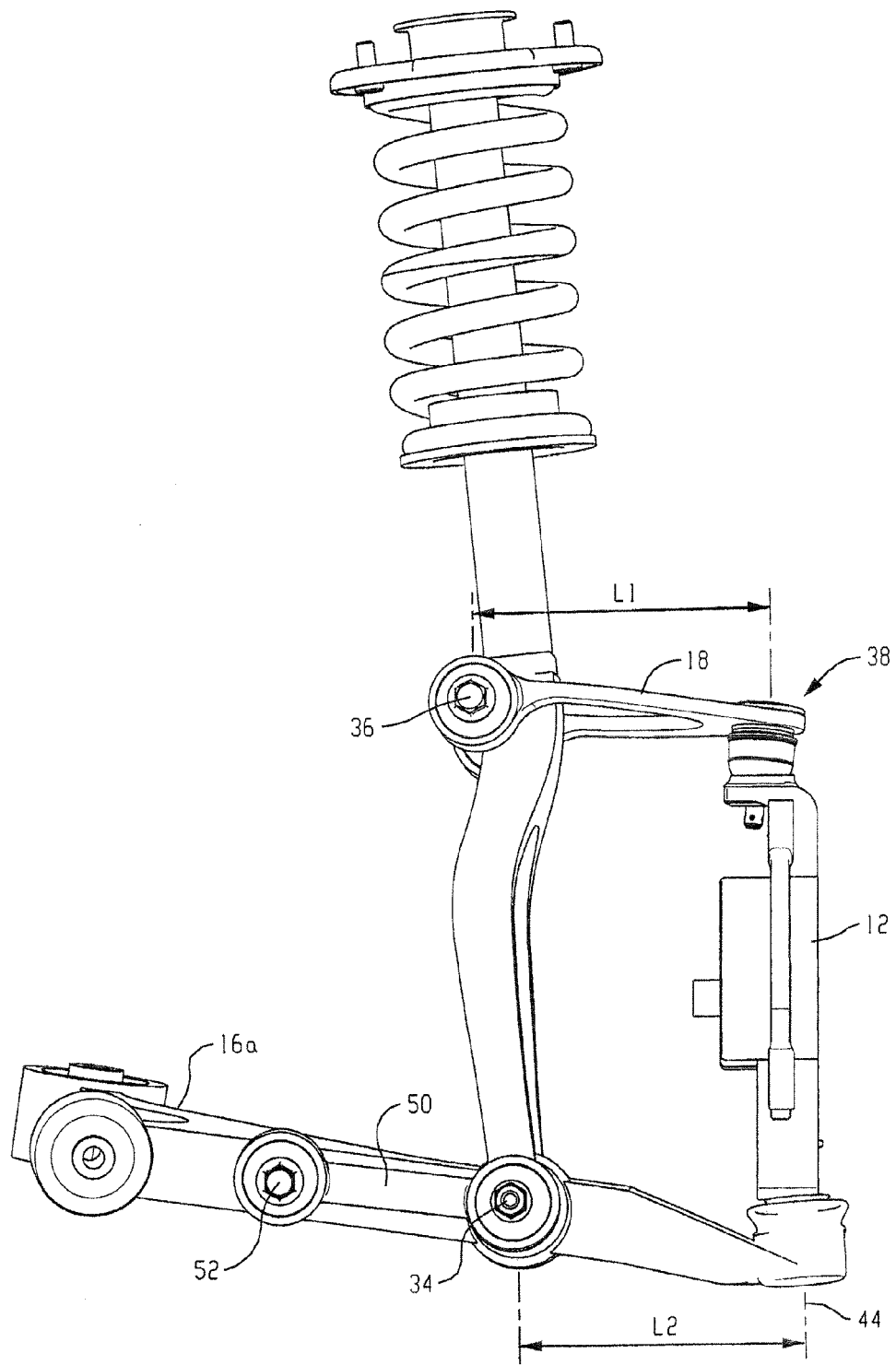
FIG. 2 is a front elevation view of the suspension assembly of FIG. 1.

The upper arm 18 has an inner portion or end 18a and an outer portion or end 18b. The inner end 18a of the upper arm 18 is rotatably connected to the spring-damper assembly 14 about a connecting axis 42 at an upper arm pivot location 36 spaced apart from the lower arm pivot location 34 and the outer end 18b of the upper arm 18 is connected to the knuckle 12 by a second ball joint 38 (an upper ball joint in the illustrated embodiment). In particular, in the illustrated embodiment, the inner end 18a is formed as a pair of spaced apart legs that are rotatably connected to the spring-damper assembly 14. Referring to FIG. 2, a kingpin axis 44 is defined by the ball joints 32, 38. Advantageously, the kingpin axis 44 can be angularly oriented relative to a height of the vehicle by about 4-14 degrees and in the illustrated embodiment is angularly oriented by about 4-5 degrees.

In addition, the suspension assembly 10 can have reduced kingpin offset (i.e., a lateral distance between a center of a tire carried by the suspension assembly 10 and the kingpin axis 44). For example, in the illustrated embodiment, the offset is between about 30-40 mm, which reduces steering disturbances caused by tire forces. This offset dimension is significantly less than the MacPherson strut and double-wishbone suspension assemblies. Also, the suspension assembly 10 can have reduced kingpin angle, which can reduce overall steering rack load. Advantageously, the kingpin angle and the kingpin offset, as well as various other suspension performance dynamics (e.g., camber angle, toe angle, etc.) are flexible by design with the suspension assembly 10 and performance changes do not necessarily require a change in suspension packaging. This allows the suspension assembly 10 to be used on a wide variety of vehicles and vehicle models, even when suspension performance requirements vary significantly between vehicles and/or models.

Moreover, the suspension assembly 10 can further include a stability link 50 having a first or inner end 50a and a second or outer end 50b. The inner end 50a of the stability link 50 can be connected to at least one of the lower arm 16, as shown in the illustrated embodiment, or to the vehicle body (e.g., at a fixed location on the vehicle body). The outer end 50b of the stability link 50 can be rotatably connected to at least one of the spring-damper assembly 14, as shown in the illustrated embodiment, or to the knuckle 12. In one application, as will be described in more detail below, the stability link 50 functions to prevent relative rotation of the spring-damper assembly 14.

In the illustrated embodiment, the lower ball joint 32 is disposed at a lower end 12a of the knuckle 12 and thus the arm 16 is a lower arm and the connecting axis 30 is a lower arm connecting axis. The upper ball joint 38 is disposed at an upper end 12b of the knuckle 12 and thus the arm 18 is an upper arm and the connecting axis 40 is an upper arm connecting axis. In this embodiment, the inner end 18a of the upper arm 18 is rotatably connected to the spring-damper assembly 14 above the fork 24 and thus the upper arm pivot location 36 is disposed above or near an upper portion of the fork 24.

Figure 3:
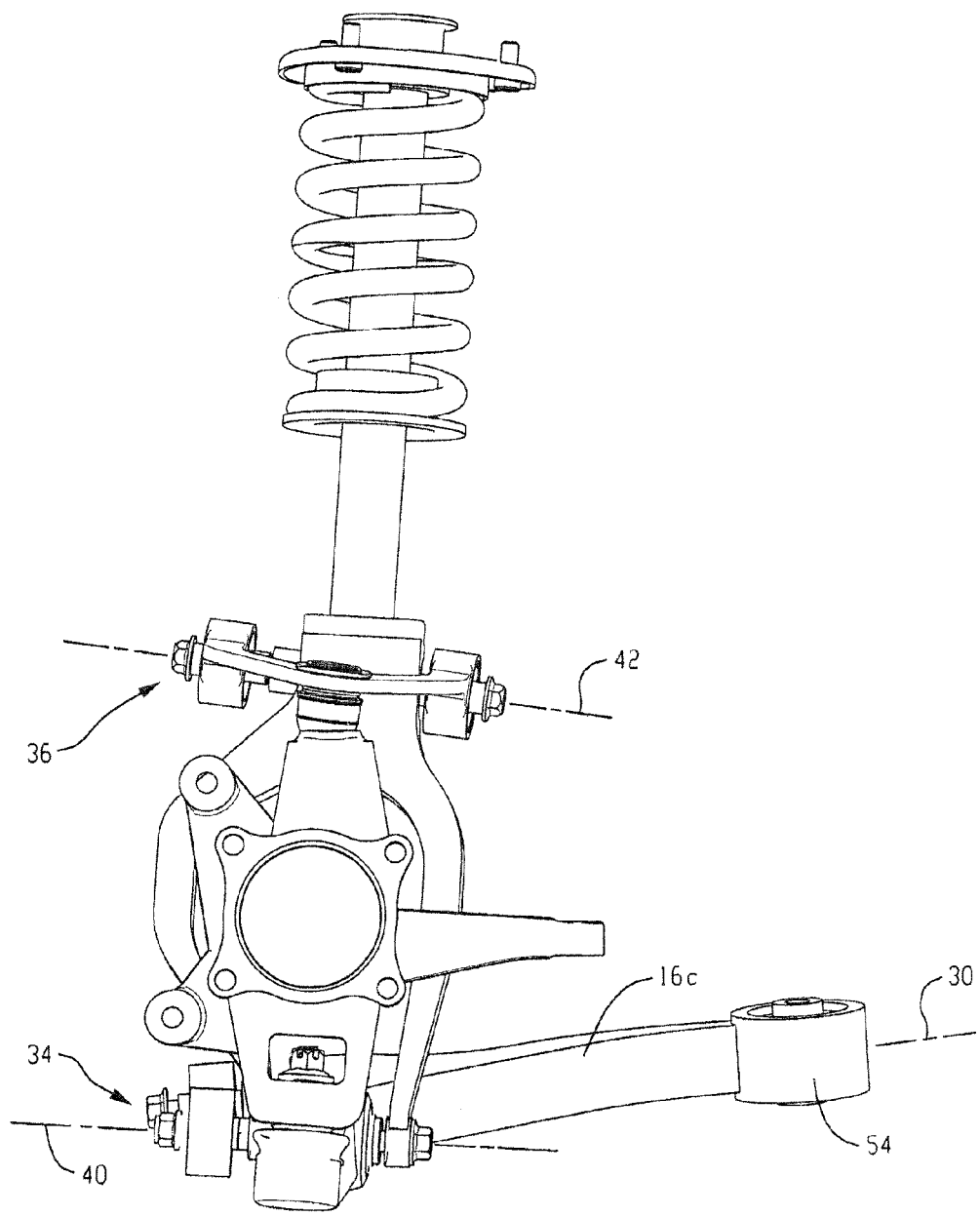
FIG. 3 is a side elevation view of the suspension assembly of FIG. 1.
Figure 4:
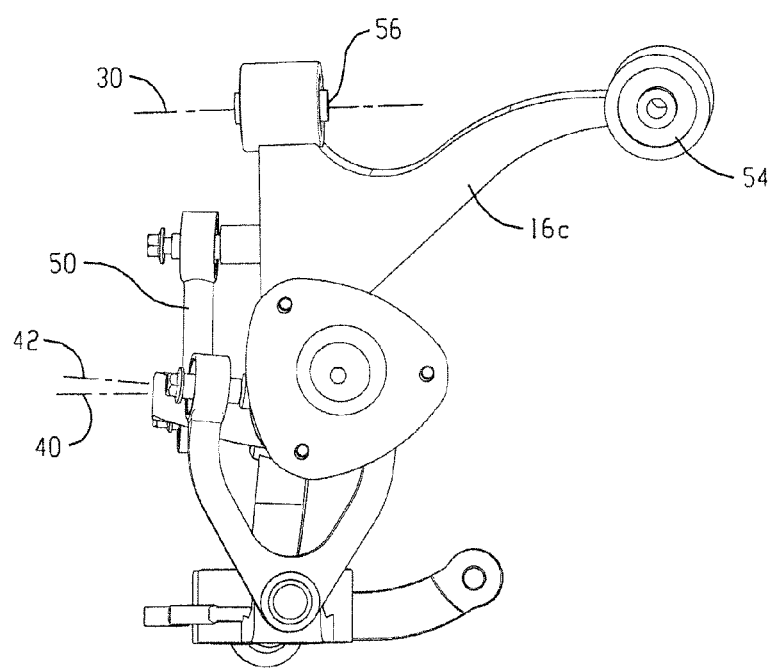
FIG. 4 is a top plan view of the suspension assembly of FIG. 1.

With specific reference to FIGS. 3 and 4, the lower arm 16 can also include a branch portion or arm 16c extending laterally inwardly. In the illustrated embodiment, a distal end of the branch arm 16c has a rotatable bushing 54 for receipt within a cooperating aperture (not shown) of the vehicle body (e.g., in a side frame member of a vehicle body) to connect the first control arm 16 to the vehicle body. The inner end 16a can also include or define a mounting aperture in which another rotatable bushing 56 is received. As is known and understood by those skilled in the art, the bushing 56 can have a central aperture 58 defined therethrough for receipt of a mounting pin (not shown) that can be rotatably connected to the vehicle body. Together, the rotatable couplings formed by the ends 16a and 16c define the connecting axis 30.

Figure 9:
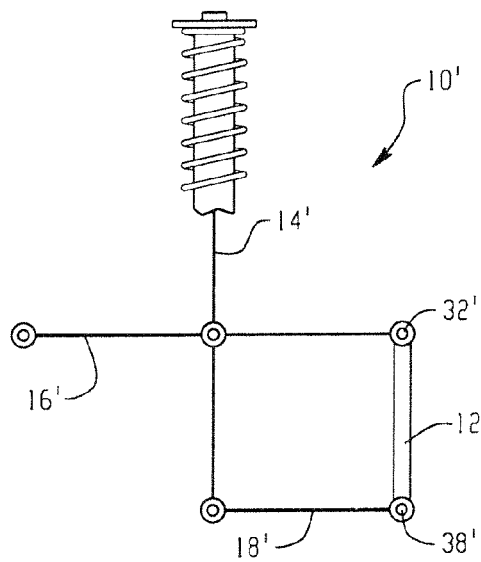
FIG. 9 is a schematic view of a suspension assembly similar to that of FIG. 1, but with the upper and lower arms reversed on the spring-damper assembly.

With brief reference to FIG. 9, another suspension assembly 10' is shown according to an alternate embodiment. In FIG. 9, like reference numerals are used to identify like components and similar components are identified with a like reference numeral followed by a prime symbol. In the suspension assembly 10', the upper and lower arms are reversed so that first control arm 16' is connected to an intermediate portion of spring-damper assembly 14' and second control arm 18' is connected to a lower end of the spring-damper assembly 14'. In this embodiment, ball joint 32' is disposed at an upper end of knuckle 12 and ball joint 38' is disposed at a lower end of the knuckle 12. A stability link (not shown) similar to stability link 50 can also be included in the suspension assembly 10' having one end connected to the first control arm 16', such as between the inner end of the first control arm 16' and the rotatable connection with the spring-damper assembly 14', for example. The other end could be rotatably connected to the spring-damper assembly 14' as described herein in reference to the stability link 50. The embodiment of FIG. 9 is shown to illustrate that the arms 16, 18 (or 16', 18') can be reversed.

Returning to the illustrated embodiment of FIG. 2, the inner end 50a of the stability link 50 can specifically be rotatably connected to the lower arm 16 at a location 52 disposed between the inner end 16a of the first control arm 16 and the first control arm pivot location 34, though this is not required. The outer end 50b of the stability link 50 can be rotatably connected to the spring-damper assembly 14 at the first control arm pivot location 34 (e.g., concentrically therewith), though this is not required. In this arrangement, the first control arm pivot location 34 is also a stability link pivot location (i.e., the location on the spring-damper assembly 14 where the stability link 50 is rotatably connected). Advantageously, the stability link 50 can function to prevent or limit relative rotation of the spring-damper assembly 14, particularly relative to the lower arm 16.

Figure 6:
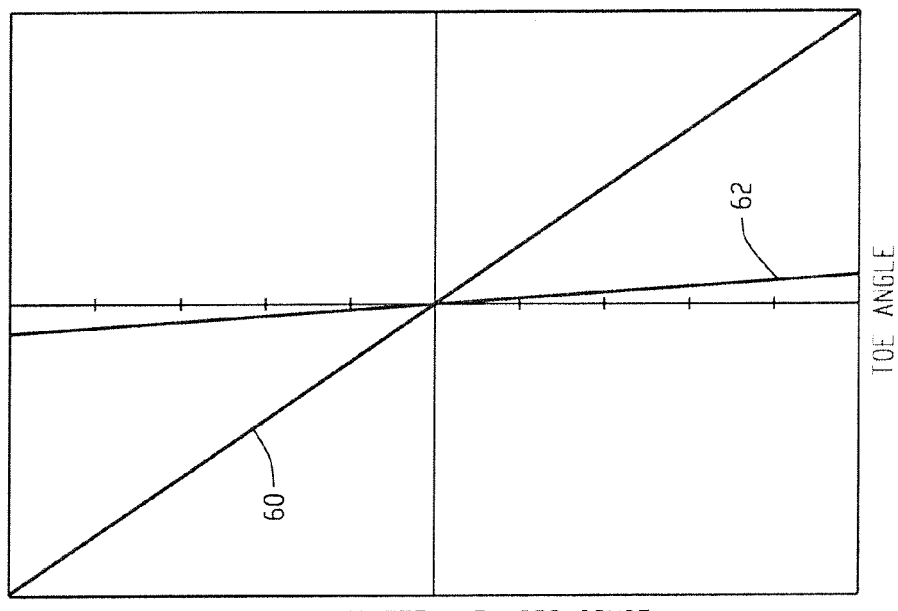

More specifically, with additional reference to FIG. 6, the stability link 50 can control or assist in controlling the toe of the wheel secured to the knuckle 12. In FIG. 6, a first performance curve 60 is shown illustrating toe angle of a wheel relative to a longitudinal force acting through the center of the wheel. This curve 60 is representative of a suspension assembly similar to the illustrated suspension assembly 10, but with the stability link 50 removed. A second performance curve 62 likewise illustrates toe angle relative to longitudinal force and is representative of the suspension assembly 10, which includes the stability link 50. As will be appreciated by those skilled in the art, the stability link 50 allows for better toe control, particularly as related to longitudinal forces realized by the wheel on the knuckle 12.

Figure 10:
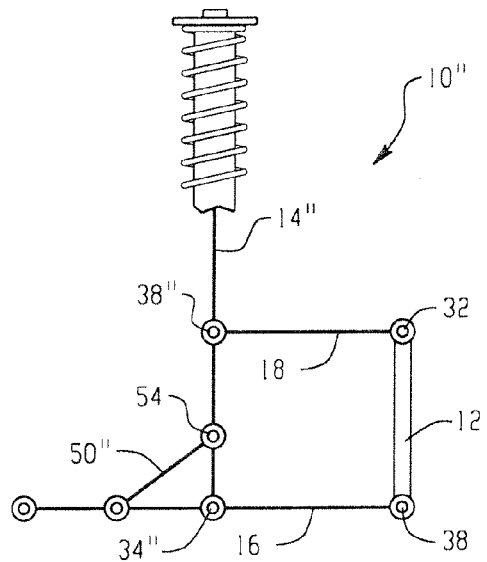
FIG. 10 is a schematic view of a suspension assembly similar to that of FIG. 1, but having a stability link connected to a spring-damper assembly at an offset location.

With brief reference to FIG. 10, an alternate suspension assembly 10" is shown wherein like reference numerals are used to identify like components and similar components are identified with a like reference numeral followed by a double prime symbol. In the suspension assembly 10", the outer end of the illustrated stability link 50" is rotatably connected to spring-damper assembly 14" at a stability link pivot location 54 that is disposed between and spaced apart from each of first control arm pivot location 34" and second control arm pivot location 38". This alters the suspension performance dynamics of the suspension assembly 10", particularly as compared to the suspension assembly 10. In particular, with the outer end of the stability link 50" connected to the spring-damper assembly 14" at location 54 spaced apart along the spring-damper assembly 14" from the fork connecting axis (which would be located at the first control arm pivot location), the toe angle of the suspension assembly 10" is variably controlled relative to suspension stroke.

Figure 7:
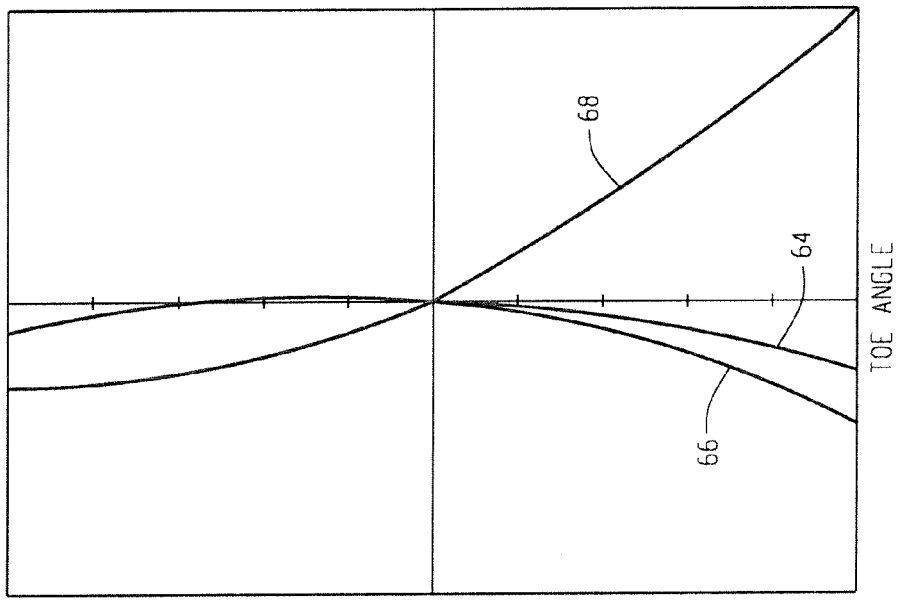
FIGS. 6, 7 and 8 are graphs showing various suspension characteristics.

With reference to FIG. 7, three curves 64, 66, 68 are shown illustrating toe angle versus suspension stroke. The first curve 64 shows toe angle relative to suspension stroke in a suspension similar to suspension assembly 10, but with the stability link 50 removed. The second curve 66 shows toe angle relative to suspension stroke for the suspension assembly 10, which includes the stability link 50 having its outer end 50b connected to the spring-damper assembly 14 at the same location 34 where the fork arms 26, 28 rotatably connect to the first control arm 16. The third curve 66 shows toe angle relative to suspension stroke for the suspension assembly 10" of FIG. 10, which includes stability link 50" having its outer end connected to the spring-damper assembly 14" at the stability link pivot location 54, a location offset along the spring-damper assembly 14" from the first control arm pivot location 34". Of course, the stability link 50" could be connected at other locations along the spring-damper assembly 14" and is not limited to the example location 54 depicted in FIG. 10.

Figure 5:
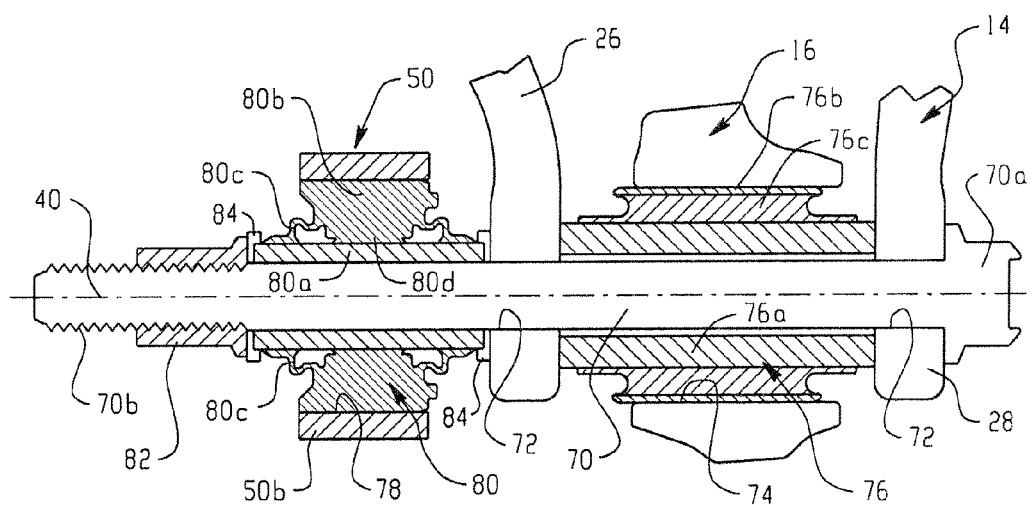
FIG. 5 is a partial cross sectional view of a pivot pin connecting a lower end of a spring-damper assembly to a lower arm in the suspension assembly of FIG. 1.

In any of the suspension assemblies 10, 10' or 10", the outer end of the stability link can be rotatably connected to the spring-damper assembly by a pivot pin or stud. Where the spring-damper assembly includes a fork, the pivot pin can extend through the spaced apart legs of the spring-damper assembly to limit relative rotation of the spring-damper assembly. For example, with additional reference to FIG. 5, the outer end 50b of the stability link 50 in the suspension assembly 10 is rotatably connected to pivot pin 70, which defines the connecting axis 40. The pivot pin 70 can extend through the spaced apart legs 26, 28 of the spring-damper assembly 14, particularly through apertures 72 respectively defined in the legs 26, 28, and can function to limit relative rotation of the spring-damper assembly 14. In particular, the spaced apart legs 26, 28 of the spring-damper assembly's fork 24 are rotatably connected to the first control arm 16 at the first control arm pivot location 34 by the pivot pin 70.

The pivot pin 70 is also received through an aperture 74 defined in the lower arm 16. As shown, a bushing 76 can be radially interposed between the portion of the first control arm 16 defining the aperture 74 and the pivot pin 70 to rotatably connect the first control arm 16 to the pivot pin 70. In the illustrated embodiment, the bushing 76 includes a rigid inner collar 76a (e.g., formed of a metal) radially adjacent the pivot pin 70, an outer rigid sleeve 76b (e.g., formed of a metal) radially adjacent the portion of the first control arm 16 defining the aperture 74, and a resilient portion 76c (e.g., formed of rubber) interposed between the collar 76a and the sleeve 76b. It is to be appreciated and understood that other bushing types could be used and/or other types of rotatable connections can be employed for rotatably connecting the spring-damper assembly 14 and the first control arm 16.

The pivot pin is also received through an aperture 78 defined in the stability link 50. In the illustrated embodiment, the outer end 50b of the stability link is connected to the pivot pin 70 by a pillow ball joint 80 that is radially interposed between the portion of the stability link 50 defining the aperture 78 and the pivot pin 70. This can prevent non-axial rotation of the pivot pin 70 (e.g., about an axis of the spring-damper assembly 14), which in turn limits rotation of the fork 24 and more generally of the spring-damper assembly 14 relative to the first control arm 16. The illustrated pillow ball joint 80 includes a rigid inner collar 80a (e.g., formed of a metal) radially adjacent the pivot pin 70, a pillow joint housing 80b interposed between the collar 78a and the portion of the stability link 50 defining the aperture 78, and boots 80c at opposite axial ends of the joint 80 to seal a rotatably connection area 80d between the housing 80b and the collar 80a. It is to be appreciated and understood that other ball joints could be used and/or other types of rotatable connections can be employed for rotatably connecting the stability link 50.

The pivot pin 70 of the illustrated embodiment has a head 70a at one end and a threaded member 82 (e.g., a nut) threadedly received along a threaded portion 70b of the pivot pin 70 to axially secure the fork legs 26, 28, the first control arm 16 and the stability link 50 together. Spacers 84 can be axially disposed at both ends of the collar 80a of the pillow ball joint 80 to space the same from, respectively, the threaded member 82 and the fork leg 26. It is again to be appreciated and understood that other pivot pins could be used and/or other rotatably connections.

With specific reference back to FIG. 2, an upper arm distance L1 is defined between the second control arm pivot location 36 and the ball joint 38 connecting the second control arm 18 to the knuckle 12. A lower arm distance L2 is defined between the first control arm pivot location 34 and the ball joint 32 connecting the first control arm 16 to the knuckle 12. In the illustrated embodiment, the distance L1 is approximately equal to the distance L2. This results in particular camber angle change relative to suspension stroke. More particularly, with additional reference to FIG. 8, a curve 90 represents camber angle change relative to suspension stroke for a suspension assembly, such as suspension assembly 10, where the distances L1 and L2 are equal to one another.

Figure 8:
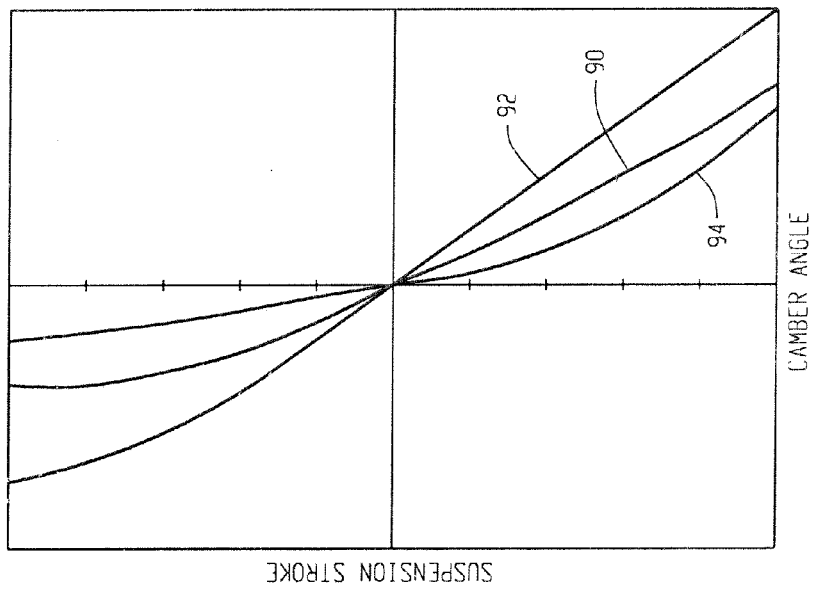
Figure 11:
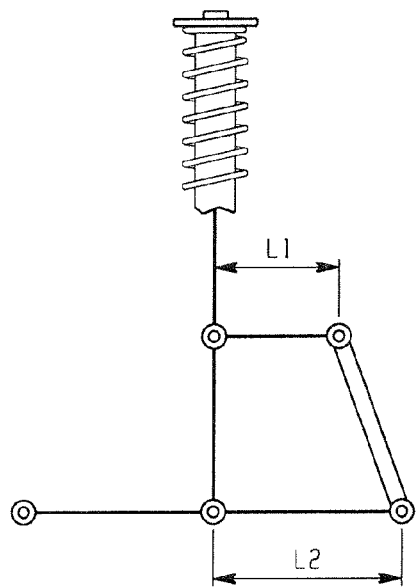
FIG. 11 is a schematic view of a suspension assembly similar to that of FIG. 1, but having an upper arm distance that is less than a lower arm distance.
Figure 12:
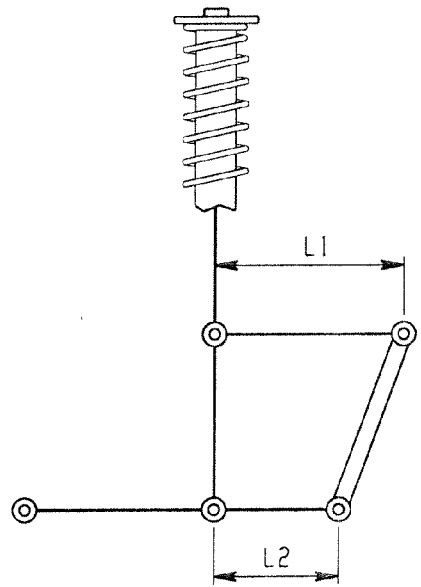
FIG. 12 is a schematic view of a suspension assembly similar to that of FIG. 1, but having an upper arm distance that is greater than a lower arm distance.

In alternate arrangements, the distances L1 and L2 can be unequal to variably control camber angle change of the suspension assembly relative to suspension stroke (different ratios of L1 to L2 can variably change camber angle response to suspension stroke). Applied to the suspension assembly 10, the upper arm distance L1 defined between the second control arm pivot location 36 and the ball joint 38 can be unequal to the lower arm distance L2 defined between the first control arm pivot location 34 and the ball joint 32. For example, the upper arm distance L1 can be less than the lower arm distance L2. A schematic example of such a suspension assembly is shown in FIG. 11. Though not shown, a stability link could be added to the illustrated suspension assembly in accordance with any of the embodiments discussed herein. Curve 92 of FIG. 8 represents camber angle performance relative to suspension stroke for such a suspension assembly (i.e., where L1 is less than L2). In another example, the upper arm distance L1 can be greater than the lower arm distance L2. A schematic example of such a suspension assembly is shown in FIG. 12. Curve 94 of FIG. 8 is representative of camber angle change relative to suspension stroke for this suspension assembly (i.e., where L1 is greater than L2). While not shown, it is to be appreciated that unequal arm dimensions can also be used with the alternative suspension assemblies discussed herein, including those schematically illustrated in FIGS. 9 and 10.

In addition to the advantages already mentioned, the suspension assembly 10 can also allow for any two or more of the first control arm connecting axis 30, the spring-damper connecting axis 40 and the second control arm connecting axis 42 to be skewed or parallel relative to one another when the suspension assembly 10 is designed. In one such arrangement, the connecting axis 42 can be skewed relative to the connecting axis 30. In addition, or in the alternative, the connecting axis 42 can be skewed relative to the spring-damper connecting axis 40. In a further addition, or in a further alternate, the connecting axis 30 can be skewed relative to the spring-damper connecting axis 40 and so on.

Figure 13:
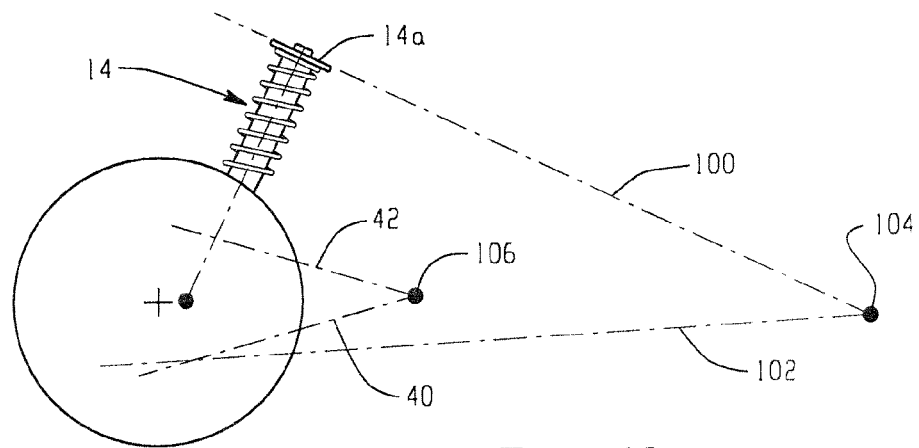
FIGS. 13, 14 and 15 are schematic side views showing anti-geometry characteristics of suspension assemblies.

In a side view, with reference to FIG. 13, the intersection of a virtual axis 100 formed by the mounting of the upper end 14a of the spring-damper assembly 14 and a virtual axis 102 of the first control arm 16 create an instant center 104. The axis 100 can be oriented perpendicularly relative to an axis of the spring-damper assembly 14. Similarly, the intersection of the spring-damper connecting axis 40 and the second control arm connecting axis 42 create an instant center 106. In one aspect, it can be the motion created by the continual change of these instant centers through suspension stroke that is unique as it relates to suspension anti-geometry of a suspension. Because the axes are independent of each other and can be arranged parallel or skewed relative to each other, the suspension has a broad range of tunability as it relates to the anti-geometry of the suspension.

Figure 14:
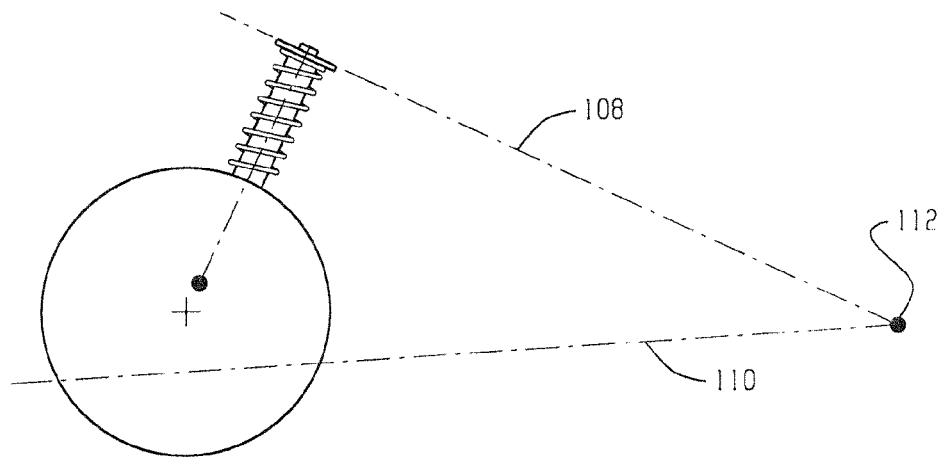
Figure 15:
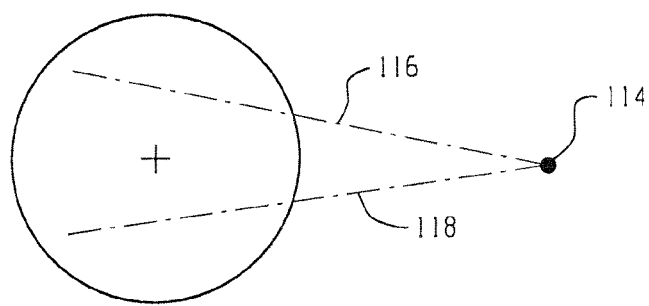

With reference to FIG. 14, in a typical strut suspension, anti-geometry is controlled by the angle of the strut mount (i.e., axis 108) and a lower arm axis 110. Instant center 112 of these two axes 108, 110 as viewed from the side controls the anti-geometry characteristics of this suspension. Accordingly, and in contrast to the suspension assembly 10, the typical strut suspension has limited flexibility in anti-geometry design as the caster angle, among other characteristics, is dependent upon the position of the strut mount as well. In a typical double wishbone suspension, with reference to FIG. 15, instant center 114 formed at the intersection of an upper arm axis 116 and a lower arm axis 118 controls the anti-geometry characteristics. When designing a suspension, this forces compromises when considering the balance of anti-geometry and other suspension characteristics. In contrast to the limitations imposed by the suspensions represented by FIGS. 14 and 15, the suspension assembly 10 and the design flexibility afforded thereby allows for a combination of two instant centers (i.e., centers 104 and 106) formed between the aforementioned axes to control the anti-geometry, thus allowing for decoupling from or modification of the anti-geometry without affect to other suspension characteristics. As will be understood and appreciated by those skilled in the art, the same or similar concept can apply for the roll center when considered from the rear view.

Figure 16:
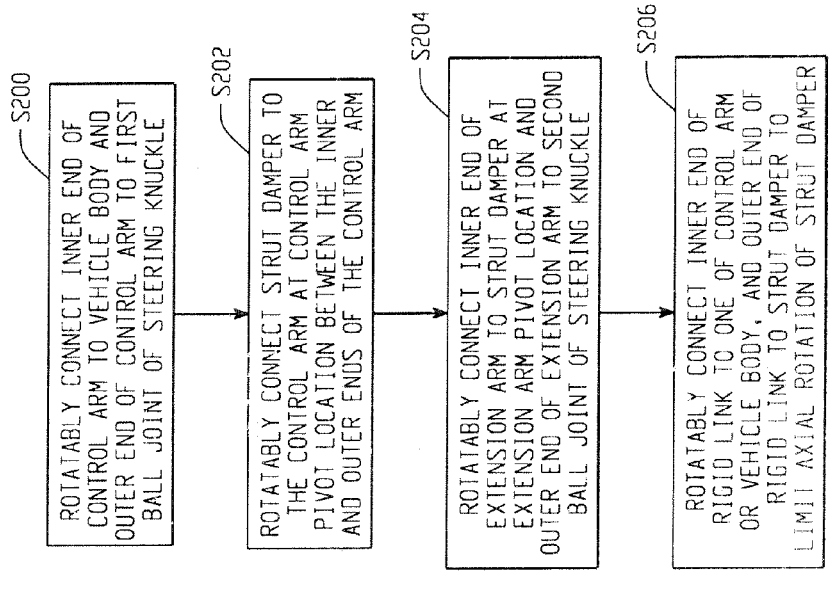
FIG. 16 is a process flow diagram illustrating a method for constructing a suspension assembly.

With reference now to FIG. 16, a method for constructing a variably tuned suspension assembly will now be described. In particular, the method will be described in reference to the suspension assembly 10 illustrated in FIGS. 1-5, though it is to be appreciated that the method could be used with other suspension assemblies, including those discussed herein as alternate embodiments. In the method as relates to suspension assembly 10, inner end 16a of first control arm 16 can be rotatably connected to a vehicle body and outer end 16b of first control arm 16 can be rotatably connected to ball joint 32 of knuckle 12 (S200). Strut damper 14 can be rotatably connected to the first control arm 16 at first control arm pivot location 34, which is between the inner and outer ends 16a, 16b of the first control arm 16 (S202). Inner end 18a of second control arm 18 can be rotatably connected to the strut damper 14 at second control arm pivot location 36 and outer end 18b of the second control arm 18 can be rotatably connected to ball joint 38 of the knuckle 12 (S204). Inner end 50a of stability link 50 can be rotatably connected to one of the first control arm 16 or the vehicle body, and outer end 50b of the stability link 50 can be rotatably connected to the spring-damper assembly 14 to limit axial rotation of the spring-damper assembly 14 (S206). On the suspension assembly 10, as already discussed, the ball joint 32 is the lower ball joint and the ball joint 38 is the upper ball joint.

Rotatably connecting the outer end 50b of the stability link 50 can include selecting a location on the spring-damper assembly 14 that corresponds to a desired toe angle change versus suspension stroke performance curve. When the outer end 50b is connected at the location 34, the performance can be that of curve 66 in FIG. 7. When the outer end 50b is connected at a location offset from location 34, the performance can vary relative to curve 66 (e.g., like curve 68). When constructing/designing a suspension assembly, a length of the second control arm, particularly relative to the first control arm, can be selected based on a desired camber angle change versus suspension stroke performance curve such as one of those shown in FIG. 8.

The suspension assemblies described herein can be compatible with a driven or undriven axle, as well as a steered or unsteered axle. In the case of a steered axle, the kingpin axis is defined by the axis between the ball joint 36 and the ball joint 38.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A suspension assembly for a vehicle, comprising:
   a knuckle;
   a spring-damper assembly laterally spaced from said knuckle;
   a first control arm having an inner end and an outer end, said inner end of said first control arm connected to a vehicle body and said outer end of said first control arm connected to said knuckle by a first ball joint, said spring-damper assembly rotatably connected to said first control arm at a first control arm pivot location between said inner and outer ends of said first control arm;
   a second control arm having an inner end and an outer end, said inner end of said second control arm rotatably connected to said spring-damper assembly at a second control arm pivot location spaced apart from said first control arm pivot location and said outer end of said second control arm connected to said knuckle by a second ball joint; and
   a stability link having an inner end and an outer end, said inner end of said stability link rotatably connected to at least one of said first control arm or the vehicle body, and said outer end of said stability link rotatably connected to said spring-damper assembly at a stability link pivot location disposed between and spaced apart from each of said first control arm pivot location and said second control arm pivot location.

2. The suspension assembly of claim 1 wherein said spring-damper assembly has a fork with spaced apart legs formed at a lower end thereof, said spaced apart legs rotatably connected to said first control arm at said first control arm pivot location by a pivot pin.

3. The suspension assembly of claim 1 wherein said inner end of said stability link is rotatably connected to said first control arm between said inner end of said first control arm and said first control arm pivot location.

4. The suspension assembly of claim 1 wherein said first ball joint is disposed at a lower end of said knuckle and said first control arm is a lower control arm, and wherein said second ball joint is disposed at an upper end of said knuckle and said second control arm is an upper control arm.

5. The suspension assembly of claim 4 wherein said spring-damper assembly has a fork with spaced apart legs formed at a lower end thereof, said spaced apart legs rotatably connected to said first control arm at said first control arm pivot location by a pivot pin, wherein said second control arm pivot location is disposed above said fork.

6. The suspension assembly of claim 4 wherein an upper arm distance defined between said second control arm pivot location and said second ball joint is unequal to a lower arm distance defined between said first control arm pivot location and said first ball joint.

7. The suspension assembly of claim 6 wherein said upper arm distance is less than said lower arm distance.

8. The suspension assembly of claim 6 wherein said upper arm distance is greater than said lower arm distance.

9. A suspension assembly, comprising:
   a lower control arm having an inner portion rotatably connected to a vehicle body about a lower arm connecting axis;
   a spring-damper assembly rotatably connected to said lower control arm about a spring-damper connecting axis;
   a knuckle having a lower end connected to an outer portion of said lower control arm by a lower ball joint;
   an upper arm having an inner portion rotatably connected to said spring-damper assembly about an upper arm connecting axis, said upper arm having an outer portion connected to an upper end of said knuckle by an upper ball joint; and
   a stability link having a first end connected to at least one of said lower control arm or said vehicle body, and a second end connected to said spring-damper assembly at a location spaced apart along said spring-damper assembly from said spring-damper connecting axis to variably control a toe angle of the suspension assembly relative to suspension stroke.

10. The suspension assembly of claim 9 wherein said first end of said stability link is connected to said lower control arm at a location spaced apart along said lower control arm from said spring-damper connecting axis.

11. The suspension assembly of claim 9, wherein said spring-damper assembly has a fork formed at a lower end thereof, said fork having spaced apart legs connected to said lower control arm by a pivot pin, said pivot pin defining said spring-damper connecting axis.

12. The suspension assembly of claim 9 wherein an upper arm distance defined between said upper arm connecting axis and said upper ball joint is unequal to a lower arm distance defined between said spring-damper connecting axis and said lower ball joint to variably control a camber angle of the suspension assembly relative to suspension stroke.

13. The suspension assembly of claim 12 wherein said upper arm distance is less than said lower arm distance.

14. A method for constructing a variably tuned suspension assembly, comprising:
   rotatably connecting an inner end of a first control arm to a vehicle body and an outer end of said first control arm to a first ball joint of a knuckle;

rotatably connecting a spring-damper assembly to said first control arm at a first control arm pivot location between said inner and outer ends of said first control arm;

rotatably connecting an inner end of a second control arm to said spring-damper assembly at a second control arm pivot location and an outer end of said second control arm to a second ball joint of said knuckle; and rotatably connecting an inner end of a stability link to one of said first control arm or said vehicle body and an outer end of said stability link to said spring-damper assembly to limit axial rotation of said spring-damper assembly wherein rotatably connecting said outer end of said stability link includes selecting a location on said spring-damper assembly corresponding to a desired toe angle versus suspension stroke performance curve.

15. The method of claim 14 wherein said first ball joint is a lower ball joint and said second ball joint is an upper ball joint, and wherein a length of said second control arm is selected based on a desired camber angle versus suspension stroke performance curve.

16. The suspension assembly of claim 1 wherein said first ball joint is disposed at an upper end of said knuckle and said first control arm is an upper control arm, and wherein said second ball joint is disposed at a lower end of said knuckle and said second control arm is a lower control arm.

17. The suspension assembly of claim 1 wherein the stability link pivot location is vertically interposed between the first control arm pivot location and the second control arm pivot location.

18. The suspension assembly of claim 9 wherein said location at which said second end of said stability link is connected to said spring-damper assembly is vertically positioned between said spring-damper connecting axis and said upper arm connecting axis.

19. The suspension assembly of claim 12 wherein said upper arm distance is greater than said lower arm distance.

* * * * *